United States Patent [19]
Kalka et al.

[11] Patent Number: 5,707,426
[45] Date of Patent: Jan. 13, 1998

[54] KEY ADVANCED LINEAR KINETIC ABSORBER METHOD USING A PARTICULATE ARRESTING DEVICE

[75] Inventors: Daniel S. Kalka, Medina; Dennis W. Johnson, Barberton; Robert B. Myers, Norton; Pervaje A. Bhat, North Canton, all of Ohio

[73] Assignee: The Babcock & Wilcox Company, New Orleans, La.

[21] Appl. No.: 818,557

[22] Filed: Mar. 1, 1997

Related U.S. Application Data

[62] Division of Ser. No. 600,708, Feb. 13, 1996, Pat. No. 5,676,715.

[51] Int. Cl.⁶ .................................................. B01D 47/12
[52] U.S. Cl. .................................................. 95/200; 95/225
[58] Field of Search .......................... 55/222, 228, 229, 55/267–269, 223, 242; 95/187, 199, 200, 228, 223–225, 288; 423/210; 422/173; 261/116, 151, 146, 147, DIG. 9; 165/60

[56] References Cited

U.S. PATENT DOCUMENTS

| | | | |
|---|---|---|---|
| 1,023,260 | 4/1912 | Luehrs et al. | 55/222 |
| 1,471,112 | 10/1923 | Ellis | 55/222 |
| 3,733,777 | 5/1973 | Huntington | 55/233 X |
| 3,800,505 | 4/1974 | Tarves, Jr. | 55/228 X |
| 3,851,822 | 12/1974 | Pocrnja et al. | 55/269 X |
| 4,263,021 | 4/1981 | Downs et al. | 55/248 X |
| 4,287,938 | 9/1981 | Lagerquist et al. | 261/151 X |
| 4,487,139 | 12/1984 | Warner | 110/345 |
| 4,557,202 | 12/1985 | Warner | 110/216 |
| 4,574,062 | 3/1986 | Weitman | 55/222 X |
| 4,681,744 | 7/1987 | Weitman | 422/173 |
| 4,705,101 | 11/1987 | Warner | 165/104.31 |
| 4,936,880 | 6/1990 | Sundberg | 55/222 |
| 4,941,324 | 7/1990 | Peterson et al. | 55/222 X |
| 4,999,167 | 3/1991 | Skelley et al. | 422/175 |
| 5,108,469 | 4/1992 | Christ | 55/259 X |
| 5,176,723 | 1/1993 | Liu et al. | 55/222 X |
| 5,246,471 | 9/1993 | Bhat et al. | 55/223 |
| 5,344,617 | 9/1994 | Johnson | 422/172 |
| 5,368,096 | 11/1994 | Williams | 165/113 |
| 5,480,619 | 1/1996 | Johnson et al. | 422/168 |
| 5,510,087 | 4/1996 | Johnson et al. | 422/173 |
| 5,534,230 | 7/1996 | Johnson et al. | 422/173 |
| 5,567,215 | 10/1996 | Bielawski et al. | 95/288 X |
| 5,599,382 | 2/1997 | Bielawski et al. | 95/288 |

OTHER PUBLICATIONS

Jinjun Sun et al, "A Method to Increase Control Efficiencies of Wet Scrubbers for Submicron Particles and Particulate Metals," Air & Waste, Feb. 1994 vol. 44.

"Utility Seeks to Integrate Heat Recovery Flue Gas Treatment", Power, May, 1993.

J.G. Noblett, Jr. et al, "Control of Air Toxics From Coal Fired Power Plants Using FGD Technology", EPRI Symposium on SO₂ Control, 1993, Boston.

(List continued on next page.)

*Primary Examiner*—Richard L. Chiesa
*Attorney, Agent, or Firm*—Daniel S. Kalka; Robert J. Edwards

[57] ABSTRACT

A method for improved removal of particulates and contaminants from a flue gas produced by the combustion of waste materials or fossil fuels in industrial processes having at least one horizontally oriented heat exchanger stage in which a wet scrubbing solution, such as an alkali reagent is sprayed in the same direction as the flue gas flow and a drain mechanism is located below the horizontally oriented heat exchanger. The horizontal orientation of the heat exchanger and the location of the drain mechanism increase the removal efficiency of very small particulates and contaminants. A collection tank is connected to the drain mechanism. A spray washing system is provided adjacent a mist eliminator and one or more additional heat exchanger stages for unplugging the heat exchanger and enhancing small particulate removal within the system.

5 Claims, 4 Drawing Sheets

OTHER PUBLICATIONS

"Flux–Force/Condensation Scrubbing System Controls Emissions From Medical Waste Incinerator", The Air Pollution Cons. Nov./Dec. 1993.

The McIlvaine Scrubber Manual, vol. IV, Ch. 2.4 Mist Eliminators, pp. 124, 481–124,495, Jan., 1979.

Scrubber Generated Particulate Literature Survey—EPRI Report CS–1739, Mar. 1981.

Entrainment Separators for Scrubbers—Seymour Calvert et al. EPA Report 650/2–74–119a Oct. 1974.

P.A. Bhat et al. "Results of Particulate and Gaseous Sampling from a Wet Scrubber Pilot Plant" presented EPRI Sym Apr./5–8, 1993.

Babcock & Wilcox White Paper On Condensing Heat Exchangers—admitted prior art, 1993.

KEY ADVANCED LINEAR KINETIC ABSORBER METHOD USING A PARTICULATE ARRESTING DEVICE

This is a divisional of application Ser. No. 08/600,708 filed Feb. 13, 1996, now U.S. Pat. No. 5,676,715.

BACKGROUND OF THE INVENTION

1. Field of the Invention

The present invention relates to a new and useful apparatus and enhanced method for removing particulate matter, such as fly ash, and aerosols, or other fine contaminants from flue gases formed during the combustion of waste materials, coal, oil and other fossil fuels, burned by electric power generating plants or other industrial processes.

2. Description of the Related Art

A known apparatus for integrated heat recovery and removal of particulates, sulfur oxides/acid gases and other contaminants from a hot combustion exhaust gas includes condensing heat exchangers. This type of heat exchanger can recover both sensible and latent heat from the flue gas in a single unit. A common arrangement is for the gas to pass down through the heat exchanger while the water passes upward in a serpentine path through tubes. Condensation occurs within the heat exchanger as the gas temperature at the tube surface is brought below the dew point. The condensate falls as a constant rain over the tube array and is removed at the bottom. Gas cleaning occurs within the heat exchanger by the mechanisms of absorption, condensation, and impaction as the gas is cooled below the dew point.

The heat exchanger tubes and inside surfaces of the heat exchanger shell are made of corrosion resistant material or are covered with TEFLON® to protect them from corrosion when the flue gas temperature is brought below the acid dew point. Interconnections between the heat exchanger tubes are made outside a tube sheet and are not exposed to the corrosive flue gas stream.

Another known apparatus is an integrated flue gas treatment (IFGT™) system, which is a condensing heat exchanger designed to enhance the removal of particulates, sulfur oxides/acid gases and other contaminants from the flue gas stream. The heat exchanger tubes and inside surfaces of the heat exchanger shell are also made of corrosion resistant material or are covered with TEFLON® or other fluoroplastic covering. There are five (5) major sections of an integrated flue gas treatment system; the first heat exchanger stage, the interstage transition, the second heat exchanger stage, the reagent spray system and the mist eliminator.

Most of the sensible heat is removed from the gas in the first heat exchanger stage of the integrated flue gas treatment system. The interstage transition can be equipped with water and/or alkali spray systems. The spray systems saturate the flue gas with moisture before it enters the second heat exchanger stage and also assist in removing particulates, sulfur oxides/acid gases and other contaminants from the gas. The interstage transition is made of corrosion resistant material such as fiberglass-reinforced plastic.

The second heat exchanger stage is operated in a condensing mode, removing latent heat and pollutants from the gas. The upper section of the second heat exchanger stage is equipped with an alkali solution spray system. The gas in this stage is flowing upward while the spray droplets move downward. This counter-current gas/droplet flow provides a scrubbing mechanism that enhances the capture of particulates, sulfur oxides/acid gases and other contaminants. The captured particulates, sulfur oxides/acid gases and other contaminants that are contained in the falling condensate/reacted alkali solution droplets are collected at the bottom of the interstage transition. The flue gas outlet of the integrated flue gas treatment system is also equipped with a mist eliminator to reduce the possibility of moisture carryover.

The integrated flue gas treatment system condensing heat exchangers are effective at removing particulate matter. In tests on oil, coal, and orimulsion (a suspension of bitumen in water), the removal of particulate increases in efficiency with increasing particle size. On average, more than 60% of the particulate matter greater than or equal to 1–2 microns is removed. Almost all particles larger than 5–10 microns are removed.

However, the removal of fine particulate (less than 1–2 microns, including the submicron range) has been limited to 50% or less. The low removal rate for fine particulate matter is due partly to impaction and interception mechanisms for particulate collection are less efficient for submicron size particles. Additionally, it may result from particle growth due to condensation and hydration of the fine particles, and the formation of aerosols such as $H_2SO_4$ (sulfuric acid) mist as the flue gas cools. A significant improvement in overall particulate removal could be accomplished by improving the removal of fine particulates and aerosols from the flue gas.

Another important reason for removing the fine fraction is that it includes heavy metals (normally in oxide form, although other species will be present) and other air toxics, the emissions of which must be controlled to meet environmental standards.

Equipment which is used for the removal of fine particulates and aerosols include electrostatic precipitators, which tend to be larger in size and often experience difficulty with the re-entrainment of fine particles. Wet electrostatic precipitators are also used, but these require the use of corrosion resistant materials, in addition to their large size.

Wet scrubbers, or fume scrubbers, such as venturi scrubbers, packed towers or rod scrubbers have been used, but these use large amounts of energy. Mist eliminators also are useful, but are prone to becoming clogged and plugged with use. Baghouse or other fabric filters have similar clogging and plugging problems associated with them.

SUMMARY OF THE INVENTION

The present invention is directed to an enhanced apparatus and method for the removal of particulates, aerosols and other fine contaminants from a flue gas stream produced by the combustion of waste materials, coal, oil and other fossil fuels which are burned by power generating plants, process steam production plants, waste-to-energy plants and other industrial processes.

Accordingly, one embodiment of the invention includes an integrated flue gas treatment system having two condensing heat exchanger stages connected in series by an interstage transition region such that the second heat exchanger stage is oriented to receive a horizontal flow of flue gas therethrough. The first stage is oriented to have either a vertical or horizontal flue gas flow through it. The heat exchangers and other internal components of the system are made of corrosion resistant material, or are covered with an inert material such as TEFLON®.

The second heat exchanger stage may be equipped with an alkali reagent spray system to promote particulate/$SO_2$ removal. The cleaned flue gases leave the second heat exchanger stage and pass through a mist eliminator located between the second stage and the system outlet to a stack. Liquid collected in the mist eliminator is directed back to a collection tank.

The collection tank, or a hopper, is provided below or downstream of the second stage to collect the entrained water droplets, condensed gases, particulates, and alkali reagent. A water spray washing system is located at the inlet to the system and at the top of intermediate modules of the system, such as before the heat exchangers and mist eliminator. Periodically washing the tubes within the heat exchangers helps to prevent plugging and clogging within the heat exchangers and maintains consistent thermal performance.

Most of the heat removed in the first heat exchanger stage is sensible heat. After passing through the transition region, the flue gas enters the second heat exchanger stage where mostly latent heat is removed. Droplets are formed in the second stage by the mechanisms of condensation and coalescence. The condensed aerosol droplets and collected particulate pass downward due to gravity.

Some of the droplets, however, may migrate in the direction of the flue gas flow due to the relatively high velocity of the flue gas through the heat exchanger. The second heat exchanger stage can be made smaller than the first stage to maintain the optimum velocity of the flue gases around the heat exchanging tubes for cooler gases and to maximize the momentum effects which cause particle separation.

The droplets which are entrained in the flue gas flow do not have to be large enough to overcome the flue gas flow to reach the collection tank, as with a counter-current wet scrubbing system used in a known integrated flue gas treatment system. The condensed droplets and particles simply continue horizontally with the flue gases and downward with gravity until they reach the bottom of the heat exchanger stage and are removed from the system in a collection tank or hopper.

The method of the present invention utilizes the steps of providing a contaminated flue gas to the system, passing the flue gas through a first heat exchanger, where mostly sensible heat is removed, then passing the gas through a horizontal transition region. The gas is conveyed through a horizontally oriented second heat exchanger. The gas is further cleaned by spraying an alkali reagent in the same direction as the gas flows through the second heat exchanger. Condensed gases are collected as droplets in a drain or hopper located below the second heat exchanger. The flue gas is passed to a mist eliminator for removing entrained droplets along with more particulates and contaminants before finally allowing the gas to exit the system through an outlet.

Additionally, the first heat exchanger and mist eliminator may be periodically sprayed with a water wash to keep them unplugged and to maintain the particulate removal efficiency of the system.

The apparatus and method of the present invention have several advantages over the known integrated particulate removal systems. The apparatus of the present invention can fit into a smaller space than known devices. Since all of the flue gases and particles in the system move in the same direction, there is a lower gas side pressure drop than in standard systems where the particle flow is counter-current to the flue gas flow in the second heat exchanger stage.

Further, the present invention has improved condensible gas removal performance. Condensible gases, such as air toxics and acid gases, will form very small droplets in the cooler regions of the heat exchanger. In a standard integrated flue gas treatment system, the coolest region is downstream of the collection tank. These systems have only the mist eliminator to remove condensible gases. In the present invention, the horizontal gas stream always directs the droplets toward the drains and the collection tank, which is located near the coolest region of the heat exchanger. Therefore, condensible gases can be collected in both the heat exchanger and in the mist eliminator, improving the collection efficiency of the system.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
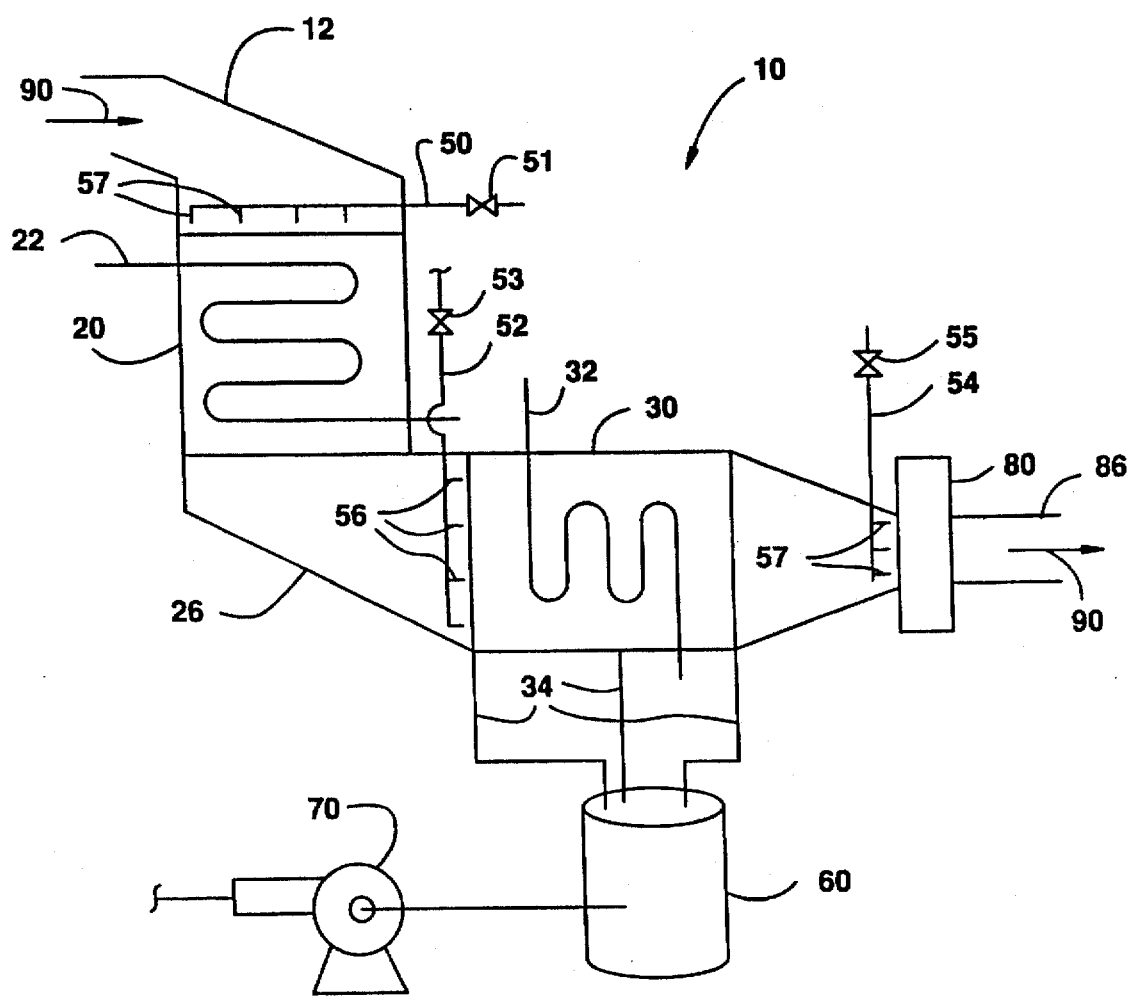
FIG. 1 is a schematic drawing showing a first embodiment of the present invention.

Referring to the drawings and in particular, FIG. 1 shows a first embodiment of the system 10 of the invention.

In this embodiment, the system 10 has an inlet 12 atop the first stage heat exchanger 20, which is connected at its lower end to transition region 26. Preferably heat exchanger 20 is a tubular heat exchanger containing horizontally positioned tubes therein with the tubes having an inert coating or covering such as TEFLON® for example. Transition region 26 connects the first stage heat exchanger 20 to the second stage heat exchanger 30. Second stage heat exchanger 30 is oriented horizontally but with its tubes positioned vertically therein. Like the tubes in the first heat exchanger 20, the tubes in the second heat exchanger 30 have an inert coating or covering like TEFLON®. The second heat exchanger 30 extends from the end of transition region 26 which it is attached to. Opposite the end connected to the transition region 26, the second stage heat exchanger 30 is connected to a mist eliminator 80, which in turn has an outlet 86.

Figure 4:
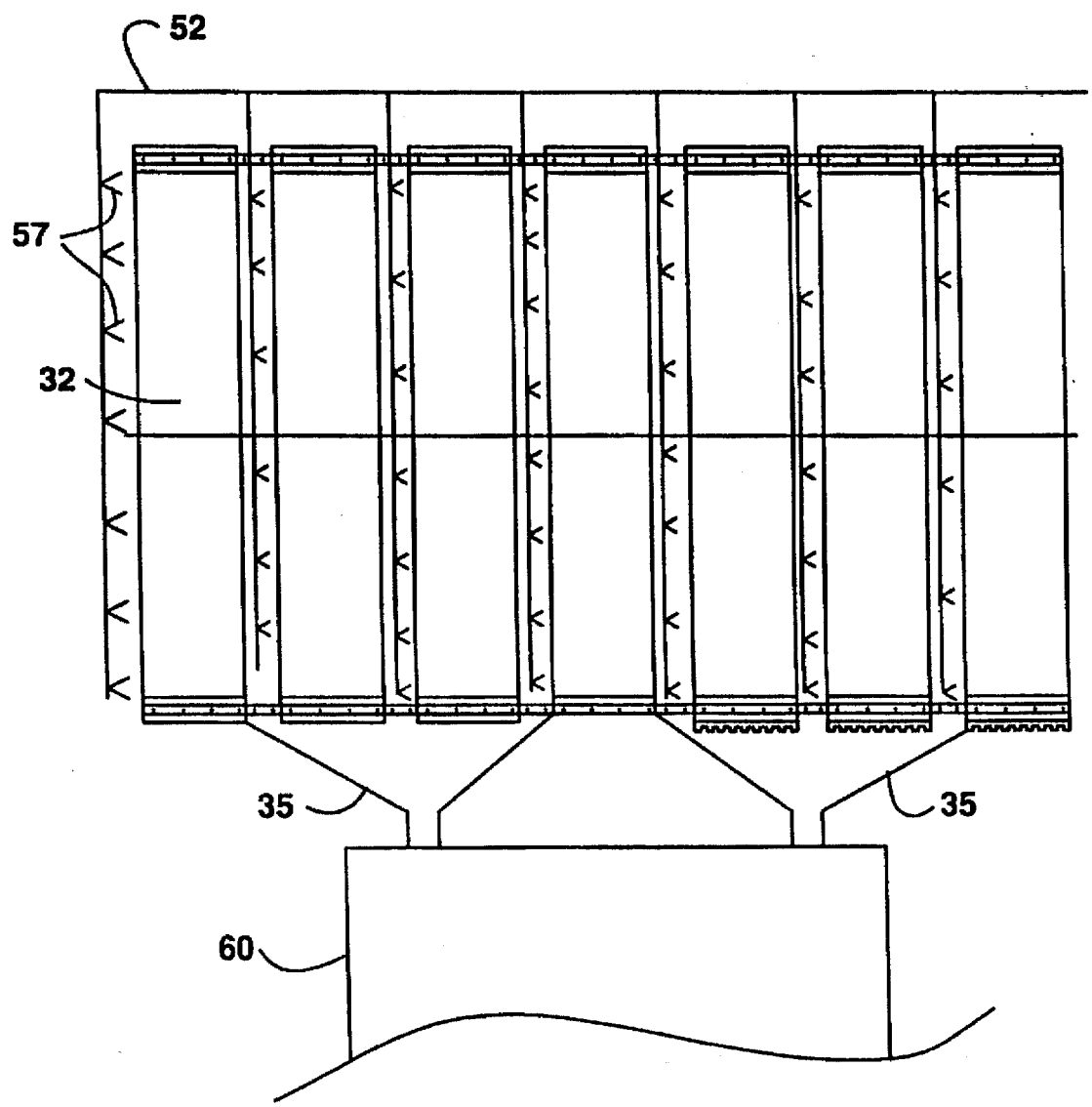
FIG. 4 is a sectional side elevation of a second heat exchanger stage used in the invention.

Located inside each heat exchanger 20, 30, are heat exchanging tubes 22, 32 constructed to receive a cooling fluid and be exposed to a flue gas. Coolant flowing through tubes 22, 32 follow a serpentine path through the heat exchangers 20, 30. As mentioned earlier, tubes 22 are preferably positioned horizontally in heat exchanger 20 and tubes 32 are preferably positioned vertically in heat exchanger 30 as shown in FIG. 1. Second stage heat exchanger 30 has at least one drain 34 at its lower end. The drains 34 which are shown may be as few as one in number, or increased and still be within the scope of this invention. The drains 34 can also be hoppers 35, as shown in FIG. 4.

Returning to FIG. 1, the drains 34 are connected to collection tank 60 which receives the condensate and spray. Tank 60 has a pump 70 connected to it near its lower end for discharging the condensate and spray, or passing it on for recycling.

Figure 3:
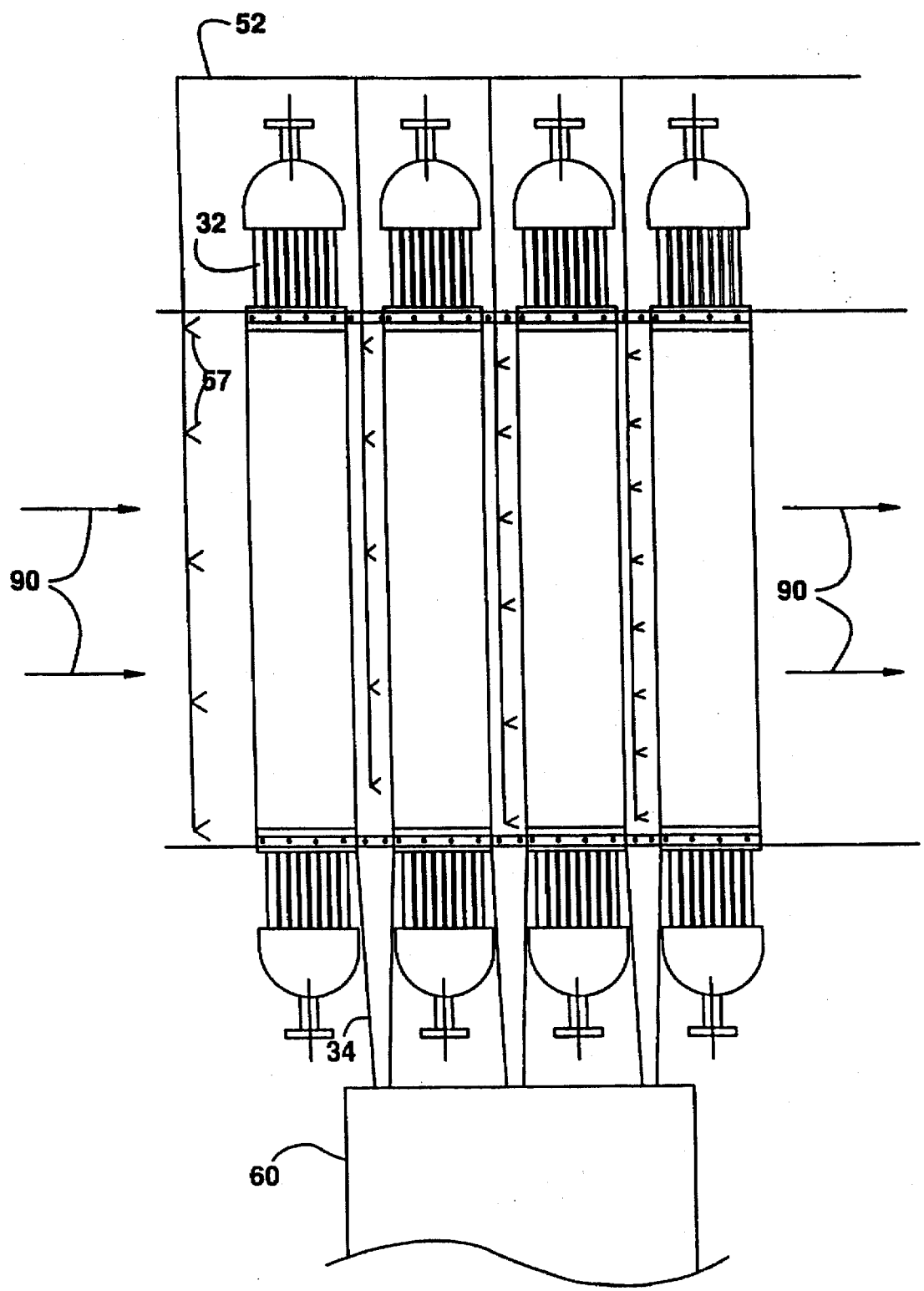
FIG. 3 is a sectional side elevation of a heat exchanger stage used in the invention.

Continuous reagent spray line 52 is located at the entrance to the second stage heat exchanger 30. Additional spray lines 52 may be located within heat exchanger 30, as shown in FIGS. 3 and 4. Each spray line has several nozzles 56 attached to it. The nozzles are oriented parallel to the heat exchanger 30, and point toward the mist eliminator 80. As shown in FIG. 1, reagent spray line 52 can have a valve 53 to control flow through the line 52. The spray line 52 is connected to the output of pump 70.

Water wash lines 50, 54 are provided at the entrance to the first stage heat exchanger 20 and mist eliminator 80. Each wash line 50,54 has a valve 51, 55 for controlling flow through it. Wash nozzles 57 are arranged along wash lines 50, 54.

Flue gas 90 is designated by an arrow showing the direction of travel through the system. Flue gas 90 enters the inlet 12, and is directed downward to the first stage heat exchanger 20 entrance past the water wash line 50.

Nozzles 57 of wash line 50 are oriented parallel to and in the direction of the flue gas 90 flow. If the wash lines are active, and water is sprayed toward the first stage heat exchanger, the water will help condense contaminants out of the flue gas 90 as well as maintain the heat exchanging tubes 22 from becoming fouled with particulates and other matter.

Once flue gas 90 passes into heat exchanger 20, sensible heat is removed through contact with heat exchanging tubes 22, which are made of corrosion resistant material, or coated with an inert covering like TEFLON®. Flue gas 90 continues through the system 10 to transition region 26, where it is redirected to the entrance of the second stage heat exchanger 30.

Reagent spray line 52 conveys an alkali reagent or slurry from tank 60 and pump 70 to nozzles 56 and into the region of the second stage heat exchanger 30. The reagent spray interacts with the flue gas to further clean and remove particulates and contaminants including acid gases from the flue gas 90, by forming condensate droplets, which fall toward the lower end of second stage heat exchanger 30 due to gravity. Since the spray is directed in the same direction as the flue gas 90 flow, there is no counter-current flow or drag to prevent condensate droplets from falling toward drains 34, to be removed from the heat exchanger 30.

Latent heat is removed from the flue gas 90 as it passes by heat exchanging tubes 32 within heat exchanger 30 before it passes to the mist eliminator 80.

At the entrance to the mist eliminator 80 is a water wash line 54 similar to wash line 50. The wash line sprays water in the direction of the flue gas 90 flow and assists with removing particulates and contaminants from the mist eliminator. The condensate or spray will drain back into the second stage heat exchanger 30, where it will be removed through drains 34. Any condensate or spray which is not removed in this manner and remains entrained in flue gas 90, will be removed by mist eliminator 80 before the flue gas 90 is allowed to pass to outlet 86.

Figure 2:
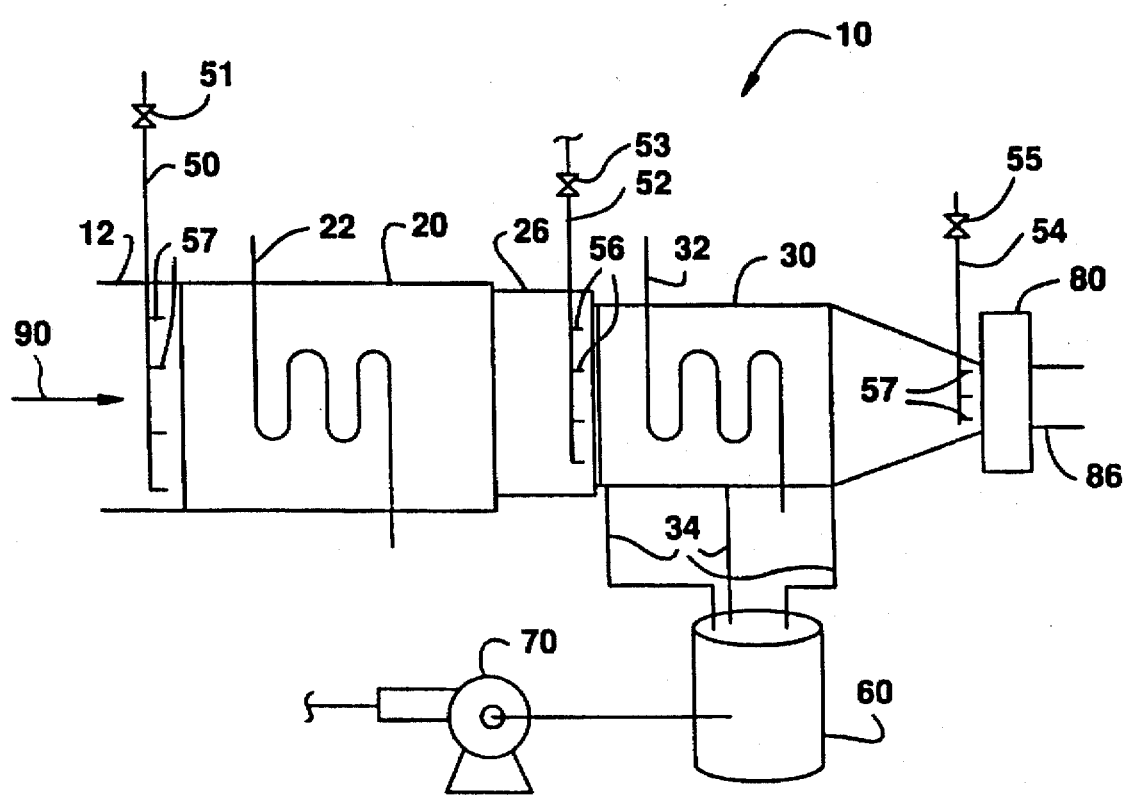
FIG. 2 is a schematic drawing showing a second embodiment of the present invention.

A second embodiment of the system 10 is shown in FIG. 2. In this version of the invention, both heat exchanger stages 20, 30 are oriented horizontally to improve the flow of the flue gas 90 through the system 10. Second stage heat exchanger 30 may also be smaller than first stage heat exchanger 20, so that when the flue gas 90 cools as it passes through the system, the velocity with which the gas 90 moves remains approximately the same through both heat exchangers 20, 30.

FIG. 3 shows the arrangement of reagent spray lines 52 in the second stage heat exchanger 30. The heat exchanging tubes 32 are oriented vertically within heat exchanger 30, so that condensate which forms on the tubes 32 will more readily fall toward the lower end or bottom of heat exchanger 30. Nozzles 57 are located along several branches of spray lines 52, between banks of heat exchanging tubes 32. The nozzles 57 are oriented in the direction of flow of flue gas 90, which is designated by the arrows.

Drains 34 are at the lower end of heat exchanger 30 and placed in between banks of heat exchanging tubes. Drains 34 are connected at their other end to tank 60. The collection tank 60 in turn contains the alkali reagent which is supplied to spray line 52 by pump 70 (as seen in FIGS. 1 and 2).

A second embodiment of the drain mechanism used in the second stage heat exchanger 30 is shown in FIG. 4. In this instance, hoppers 35 are used in place of drains 34 to convey particulates and condensate from the heat exchanger 30 to tank 60. Heat exchanging tubes 32 are arranged in more compact banks within the heat exchanger 30, so that hoppers 35 may be connected to the lower end of the heat exchanger 30.

While a specific embodiment of the invention has been shown and described in detail to illustrate the application of the principles of the invention, it will be understood that the invention may be embodied otherwise without departing from such principles.

What is claimed is:

1. A method for removing a fine particulate from a flue gas, the method comprising the steps of:

providing a flue gas to a first stage heat exchanger, the first stage heat exchanger having a first stage upper end and a first stage lower end;

providing a second stage heat exchanger having a second stage entrance and a second stage outlet, and a lower end;

connecting the first stage lower end and the second stage entrance with a transition region conduit in a manner to orient the second stage heat exchanger horizontally;

passing the flue gas to the second stage heat exchanger;

continuously spraying an aqueous spray concurrent with the flow of flue gas in the region of the second stage heat exchanger;

removing a condensate containing particulates and contaminants formed from the flue gas and aqueous spray from the second stage heat exchanger with a drain situated in the lower end of the second stage heat exchanger;

passing the flue gas to a mist eliminator to remove remaining condensate from the flue gas flow; and passing the cleaned flue gas to an outlet of the mist eliminator.

2. A method according to claim 1, further comprising spraying a water wash concurrently with the flow of flue gas at one end of the first stage heat exchanger and between the second stage heat exchanger and the mist eliminator.

3. A method according to claim 2, wherein the water wash is sprayed periodically.

4. A method according to claim 1, wherein the first stage heat exchanger is oriented horizontally.

5. A method according to claim 1, wherein the aqueous spray is an alkali reagent spray used to remove acid gases.

* * * * *